United States Patent

Papenfuhs et al.

[11] 4,097,510
[45] Jun. 27, 1978

[54] WATER-INSOLUBLE NICKEL-COMPLEX DISAZO METHINE COMPOUNDS

[75] Inventors: Theodor Papenfuhs, Frankfurt am Main; Heinrich Volk, Bad Vilbel, both of Germany

[73] Assignee: Hoechst Aktiengesellschaft, Frankfurt am Main, Germany

[21] Appl. No.: 641,252

[22] Filed: Dec. 16, 1975

[30] Foreign Application Priority Data

Apr. 9, 1975 Germany ............................ 2515523

[51] Int. Cl.$^2$ ............................................. C07F 15/04
[52] U.S. Cl. .................. 260/439 R; 8/1 C; 8/12; 8/24; 8/162 S; 8/180; 106/288 Q; 260/429 C
[58] Field of Search ....................... 260/429 C, 439 R

[56] References Cited

U.S. PATENT DOCUMENTS

| | | | |
|---|---|---|---|
| 2,993,065 | 7/1961 | Kumins et al. | 260/439 R |
| 3,398,170 | 8/1968 | Cyba | 260/439 R |
| 3,440,254 | 4/1969 | Lenoir et al. | 260/439 R X |
| 3,472,876 | 10/1969 | Klein | 260/439 R |
| 3,864,371 | 2/1975 | Inman et al. | 260/429 C X |
| 3,875,200 | 4/1975 | L'Eptattenier et al. | 260/429 C X |
| 3,895,041 | 7/1975 | Inman et al. | 260/439 R X |
| 3,939,194 | 2/1976 | L'Eptattenier et al. | 260/429 C X |
| 4,042,611 | 8/1977 | Papenfuhs et al. | 260/439 R |

Primary Examiner—Helen M. S. Sneed
Attorney, Agent, or Firm—Connolly and Hutz

[57] ABSTRACT

New water-insoluble compounds have been found of the formula

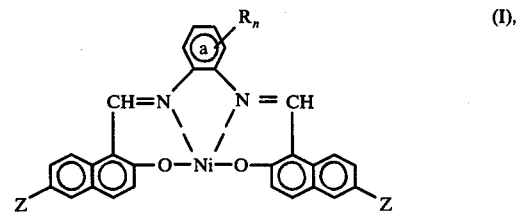

wherein $n$ is 1, 2 or 3, each R, different or the same, is halogen, lower alkyl, lower alkoxy, phenoxy, phenoxy substituted by halogen, lower alkyl or lower alkoxy, or is hydroxy, cyano, trifluoromethyl, carboxy, lower carbalkoxy or lower alkanoyl or benzoyl or benzoyl substituted by halogen, lower alkyl or lower alkoxy, and Z is hydrogen, halogen, lower alkoxy, nitro or cyano, which are well suitable as pigments for dyeing polymer masses, lacquers, caoutchouc, synthetic leather or spin-dyeing viscose or cellulose acetate, for paper and printing pastes. The dyeings obtained with them are excellently fast to light, weather and organic solvents and to the action of heat and are distinguished by a high tinctorial strength, good transparency and very clear shades.

1 Claim, No Drawings

WATER-INSOLUBLE NICKEL-COMPLEX DISAZO METHINE COMPOUNDS

New compounds have been found which have the general formula (I)

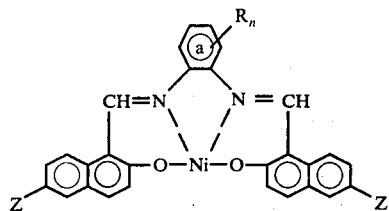

in which each R stands for a halogen atom, such as fluorine, chlorine and bromine, a lower alkyl, lower alkoxy group, phenoxy group optionally substituted by 1 or 2 substituents selected from halogen atoms, such as chlorine, lower alkyl and lower alkoxy groups, or is hydroxy, cyano, trifluoromethyl, carboxy, carboxylic acid lower alkyl ester or lower alkanoyl group, or benzoyl optionally substituted by 1 or 2 substituents selected from halogen atoms, such as chlorine, lower alkyl and lower alkoxy groups, $n$ is 1, 2 or 3, preferably 1 or 2, the 1 to 3 radicals R in the nucleus $a$ being identical or different, and each Z stands for hydrogen or halogen, such as bromine or chlorine, lower alkoxy, nitro or cyano.

The term "lower" in this context is meant to be "1 to 5 carbon atoms in the alkyl moiety".

Preferred are, especially, compounds of the formula (I) in which the substituents in the benzene nucleus are halogen atoms, such as chlorine or bromine, alkyl or alkoxy groups of 1 to 3 carbon atoms, trifluoromethyl, hydroxy, carboxy or carboxylic acid alkyl ester groups having alkyl radicals of 1 to 4 carbon atoms, and each Z stands for a hydrogen atom or bromine atom or a methoxy group, and mixtures of these compounds.

Especially preferred are dyestuffs of the formula

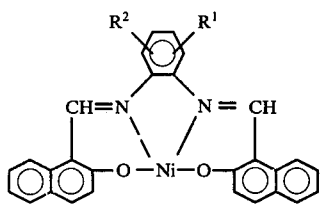

in which $R^1$ and $R^2$ are identical or different and each stands for a chlorine atom, a methyl, methoxy, ethoxy or trifluoromethyl group.

The new compounds can be obtained according to a process of the invention by condensing 2 mols of an aldehyde of the formula (II)

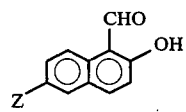

in which Z is defined as above, with 1 mol of a diamine of the formula (III)

in which R and $n$ are defined as above, and metallizing the disazo methine compound so obtained simultaneously or afterwards. If desired, mixtures of compounds of the formula (III) can also be used in the condensation reaction.

The compounds of the formula (I) can also be obtained by reducing an o-nitraniline of the general formula (IV)

in which R and $n$ are defined as above, according to usual methods, reacting the o-phenylene diamine obtained without intermediate isolation with the 2-hydroxy-1-naphthaldehyde and metallizing the disazomethine compound.

Suitable aldehydes of the formula (II) are especially those in which Z is a hydrogen atom, a chlorine or a bromine atom, a methoxy, ethoxy or propoxy group, a nitro or a cyano group. They can be obtained in known manner by formylating the corresponding 2-hydroxynaphthalenes, for example according to the method of Duff.

Suitable diamines of the formula (III) are especially those in which the benzene nucleus is substituted by at least one halogen atom, for example one or two chlorine or bromine atoms, one or two lower alkyl groups having 1 to 4 carbon atoms, such as methyl, ethyl, propyl or butyl groups, one or two lower alkoxy groups of 1 to 4 carbon atoms, such as methoxy ethoxy, propoxy or butoxy groups, a phenoxy group which may be substituted by halogen atoms, lower alkyl or alkoxy groups, a hydroxy group, a cyano group, a trifluoromethyl group, a carboxy or a carboxylic acid lower alkyl ester group, such as a methyl, ethyl, propyl or butyl carboxylic acid ester group.

The aldehyde is condensed with the diamine advantageously in water or in an organic solvent at elevated temperature, preferably between about 60° C and the boiling point of the solvent used. Suitable solvents are, especially: water, ethanol, glacial acetic acid, dimethyl formamide, N-methylpyrrolidone, glycol mono or dimethyl ether, xylene or mixtures of these solvents.

The new disazo methine compounds are sparingly soluble in the solvents mentioned and can, therefore, easily be isolated by filtration. Impurities, if ever, can be eliminated by washing them out.

The disazo methine compounds are converted into their nickel complex compounds by treating them with agents yielding bivalent nickel, for example with a salt of nickel. The nickel formiates or acetates are preferably used.

The metallization is advantageously performed in one of the above-mentioned solvents or in a mixture of these solvents.

The metallization can also be effected prior to or at the same time as the azomethine condensation by condensing the aldehyde alone or together with the diamine in one of the above-mentioned solvents or in a mixture of these solvents in the presence of nickel salts.

The new compounds turned out to be very good dyestuffs and are especially good pigments, especially after a finish processing as usual, for example for dyeing masses of synthetic material, which are, in the context, masses of synthetic material or synthetic resins free of or containing solvents and free of or containing plasticizers, for pigmenting paints on oily or aqueous basis and lacquers of most different types, for spin dyeing viscose and cellulose acetate or for pigmenting polyethylene, polystyrene, polyvinyl chloride, caoutchouc and synthetic leather. They are, however, especially suitable for the preparation of metal effect lacquers They can also be used in printing pastes for the graphic arts, for the paper mass dyeing, for coating textile materials or for pigment printing. The dyeings obtained have an excellent fastness to migration, light, weather and to solvents, an excellent heat stability and they are distinguished by a high color intensity, high tinctorial strength, a good transparency and, frequently, a high degree of purity of the shades. They also have a good fastness to over-varnishing, to bleeding and a good dispersibility.

Compared to structurally comparable dyestuffs of the formula I, in which the benzene ring *a* is unsubstituted or carries as substituents a nitro, carbamoyl or sulfamoyl group (cf. German Offenlegungsschriften No. 2,308,594; 2,007,844 and the French patent specification No. 1,416,293) the compounds of the invention are distinguished by a better fastness to migration and to solvents, for example an improved fastness to bleeding and to overvarnishing, an improved transparency and dispersibility and, especially, a higher color intensity and a purer shade.

The following Examples illustrate the invention; parts are parts by weight.

EXAMPLE 1

A mixture of 51.6 parts of 2-hydroxy-1-naphthaldehyde, 48 parts of sodium acetate and 900 parts of water was ground for 15 minutes with a dispersing equipment at room temperature. A solution of 46 parts of nickel sulfate in 150 parts of water was added and dispersed for half an hour, the temperature being raised to 30°-40° C.

The finely dispersed suspension so obtained of the 2-hydroxy-1-naphthaldehyde-nickel complex was introduced into a three-neck flask (reflux cooler, stirrer, thermometer) and heated evenly to 95° C during 2 hours after the addition of 18.3 parts of 4-methyl-o-phenylene diamine. The pH value was thus lowered from 7.8 to about 4. A solution of 48 parts of sodium acetate in 150 parts of water was added and stirred for 150 minutes at the boiling point, the solution was filtered while hot, washed with 4,000 parts of water and dried. 70 parts (95.8% of the theory) of a dyestuff of the formula

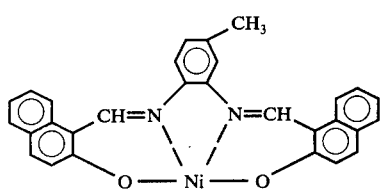

were obtained which dyed synthetic polymer materials yellowish-red shades and suited excellently for the preparation of lacquers of excellent fastness to light and to weather, especially metal effect lacquers, in which it displayed a high color intensity (tinctorial strength) and very high overvarnishing fastnesses.

When the moist filter cake of the dyestuff was stirred with 5 times the amount of dimethylformamide during 5 hours at 100° C, the suction-filtered, washed with dimethylformamide and water and then dried, a pigment was obtained which had a somewhat higher covering power, a considerably improved dispersibility and a purer shade, its other properties being unchanged.

When the 4-methyl-o-phenylene diamine was partially replaced by 3-methyl-o-phenylene diamine, pigments were obtained that had similar properties and fastnesses, a more bluish shade and a still higher color intensity (tinctorial strength). The yield was the same.

EXAMPLES 2–11

When instead of 4-methyl-o-phenylene diamine aliquote parts of other o-phenylene diamines were used and the process was performed as described in Example 1, pigments of the formula I according to the invention were obtained, their yields and shades being listed in the following Table 1.

TABLE 1

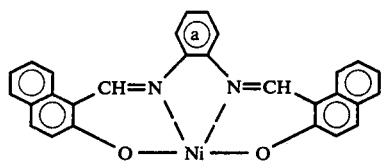

| Example | *a* | Yield | Shade |
|---|---|---|---|
| 2 | Cl | 98,2 % | scarlet |
| 3 | CN | 98,5 % | red |
| 4 | H₃C, CH₃ | 94,8 % | red-orange |
| 5 | Cl, Cl | 99,0 % | yellow-brown |
| 6 | COOH | 96,8 % | bordo |
| 7 | CH₃ | 90,3 % | bluish red |
| 8 | OCH₃ | 95,2 % | bordo |
| 9 | COOCH₃ | 97,2 % | red |
| 10 | OH | 92,7 % | bluish red |
| 11 | Cl, CH₃ | 98,0 % | orange |

EXAMPLE 12

A mixture of 51.6 parts of 2-hydroxy-1-naphthaldehyde, 22.9 parts of 3,4-diaminophenetol and 250 parts of dimethylformamide were heated to 110° C for 3 hours, then it was cooled. The orange precipitate was suction-filtered, washed with dimethyl-formamide and suspensed in 600 parts of ethanol. 27 parts of nickel acetate were added and the mixture was heated for 4 hours to the boiling point, it was suction-filtered while hot, washed with hot ethanol, then with water and dried. 75 parts (96.7% of the theory) of a compound of bordo shade of the formula

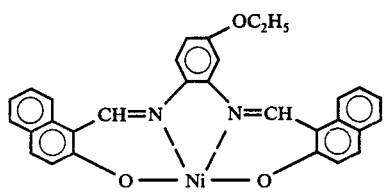

were obtained.

The compound yielded printing inks of high color intensity and could excellently be used especially in lacquers, preferably in metal effect lacquers wherein it displayed an excellent fastness to solvents, to light and to weather.

When the 3,4-diaminophenetol was replaced by aliquote amounts of 4,5-diamino-2-methylphenetol, and the process was carried out as described hereinbefore, a pigment was obtained which was a little more yellow and had, otherwise, the same properties. The yield was the same.

EXAMPLE 13

A mixture of 17.2 parts of 2-hydroxy-1-naphthaldehyde, 9 parts of nickel acetate, 300 parts of glycol-dimethyl ether and 100 parts of glacial acetic acid was stirred for 1 hour at room temperature. 8.9 parts of 3,4-diaminobenzotrifluoride were added and the mixture was heated to the boiling point during 4 hours. The precipitate was suction-filtered while hot, washed with hot ethanol, then with water and dried at 80° C.

25.3 parts (93.5% of the theory) of an orange compound were obtained which had the formula

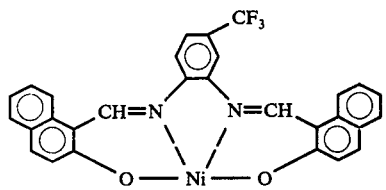

It had good pigment properties and suited especially for the preparation of automobile lacquers of high fastness to light and to weather.

When the aqueous filter cake was heated afterwards with three times the amount of N-methylpyrrolidone (4 hours at 80°–90° C) a pigment was obtained that had a purer shade and an improved dispersibility.

When the 2-hydroxy-1-naphthaldehyde of Example 13 was replaced by a corresponding amount of 6-methoxy-2-hydroxy-1-naphthaldehyde and the process was carried out as described hereinbefore, a pigment was obtained of a more intense red and of practically the same properties, but it had an even higher color intensity (tinctorial strength).

EXAMPLES 14–21

When instead of the 3,4-diaminobenzotrifluoride corresponding amounts of the o-phenylene diamines listed in Table 2 were used

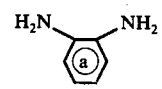

and the process was carried out as described in Example 13, further pigments of the general formula I according to the invention were obtained in the yields and shades listed in Table 2.

TABLE 2

| Example | (a) | Yield | Shade |
|---|---|---|---|
| 14 | COCH₃ | 93,7 % | bluish red |
| 15 | COOC₂H₅ | 94,8 % | yellowish red |
| 16 | Br | 99,1 % | red brown |
| 17 | O–phenyl | 97,8 % | bordo |
| 18 | O–phenyl, Cl | 97,9 % | bordo |
| 19 | H₃C, OCH₃ | 94,0 % | bluish red |
| 20 | Cl, COOCH₃ | 98,2 % | yellowish red |
| 21 | CH(CH₃)₂ | 91,7 % | red orange |

EXAMPLE 22

18.2 parts of 3-nitro-4-aminobenzoic acid were hydrogenated in 300 parts of isopropanol using Raney-Nickel as catalyst. After the consumption of the theoretical amount of hydrogen, the mixture was released, the catalyst was filtered off while hot and washed with 100 parts of hot glacial acetic acid. The combined filtrates were added to a solution of 34.4 parts of 2-hydroxy-1-naphthaldehyde in 100 parts of glacial acetic acid and heated to the boil for 3 hours. Then, the mixture was suction-filtered and washed with hot isopropanol.

The metallization according to Example 12 yielded 49 parts (95.1% of the theoretical amount) of a red brown pigment which had the same properties as that described in Example 6.

EXAMPLE 23

A mixture of 51.6 parts of 2-hydroxy-1-naphthaldehyde, 46 parts of nickel sulfate and 1,000 parts of water was ground at the by-pass over a corundum disk mill, the temperature being adjusted to 20°–30° C by means of a heat exchanger. The reaction was carried out in the equipment under nitrogen atmosphere. 18.3 parts of a mixture of 70% of 3-methyl-o-phenylene diamine and 30% of 4-methyl-o-phenylenediamine were added and heated, while grinding continuously, to 60° C during 2 hours and to 90° C during a further 2 hours. The bluish red precipitate was suction-filtered while hot, washed with hot water until neutral and dried.

70.3 parts (96.1% of the theoretical amount) of a dyestuff of the formula

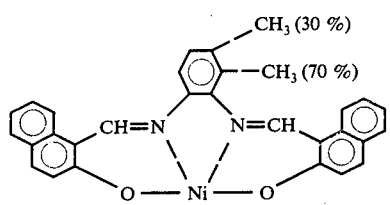

were obtained which suit for the preparation of lacquers of especially high color intensity, especially metal effect lacquers having excellent fastness to light and to weather.

Due to the fact that the shade of this preparation is more bluish than the homogeneous dyestuffs of Examples 1 or 7, or the mechanical mixtures thereof, the product prepared according to this Example is thought to represent mixed crystals.

EXAMPLES 24–32

When in Example 23 the mixture of the methyl-o-phenylene diamines is replaced by corresponding amounts of the diamines of the formula

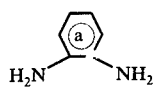

listed in Table 3, and the process is carried out in the manner indicated above, further pigments of the general formula I were obtained according to the invention, in the yields and shades compiled in the following Table 3:

TABLE 3

| Example | (a) | Yield | Shade |
|---|---|---|---|
| 24 | Cl- | 99,1 % | scarlet |
| 25 | COOC$_4$H$_9$ | 97,8 % | red |
| 26 | C$_2$H$_5$ | 97,3 % | yellowish red |
| 27 | -Cl | 98,3 % | bluish red |
| 28 | CO- | 99,3 % | bordo |
| 29 | O-⟨⟩-CH$_3$ | 98,7 % | bordo |
| 30 | Cl, OC$_2$H$_5$ | 96,8 % | scarlet |
| 31 | H$_3$C, CH$_3$ | 94,9 % | red orange |
| 32 | H$_3$C, -CH$_3$ | 95,1 % | red. |

We claim:
1. A compound of the formula

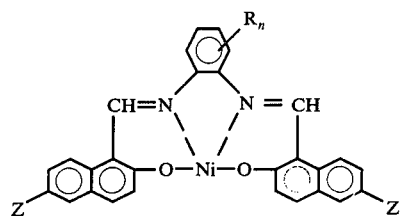

wherein each R, which is the same or different, is halogen, lower alkyl, lower alkoxy, phenoxy, phenoxy substituted by 1 or 2 substituents selected from the group consisting of halogen, lower alkyl and lower alkoxy, hydroxy, cyano, trifluoromethyl, carboxy, carboxylic acid lower alkyl ester, lower alkanoyl, benzoyl or benzoyl substituted by 1 or 2 substituents selected from the group consisting of halogen, lower alkyl and lower alkoxy, n is 1, 2 or 3 and Z is hydrogen, halogen, lower alkoxy, nitro or cyano.

* * * * *